2 Sheets--Sheet 2.

O. ZWIETUSCH.
Carbonic Acid Gas Generators.

No. 145,774. Patented Dec. 23, 1873.

Witnesses:
John G. Hirsch
J. D. Smith

Inventor:
Otto Zwietusch

UNITED STATES PATENT OFFICE.

OTTO ZWIETUSCH, OF MILWAUKEE, WISCONSIN.

IMPROVEMENT IN CARBONIC-ACID-GAS GENERATORS.

Specification forming part of Letters Patent No. 145,774, dated December 23, 1873; application filed August 19, 1873.

*To all whom it may concern:*

Be it known that I, OTTO ZWIETUSCH, of Milwaukee, in the county of Milwaukee, in the State of Wisconsin, have invented certain Improvements in Carbonic-Acid-Gas Generators, of which the following is a specification:

My invention has for its object the manufacture of carbonic-acid gas, and supplying it to suitable articles, such as kegs or barrels filled with beer or other liquids, and kept on tap to supply the place of the liquid drawn, and to keep the balance in the receptacle perfectly pure and free from adulteration by the contact of air, and the machine is arranged so as to be self-acting, and operate without any trouble or looking after when once charged and put in operation.

Figure 1:
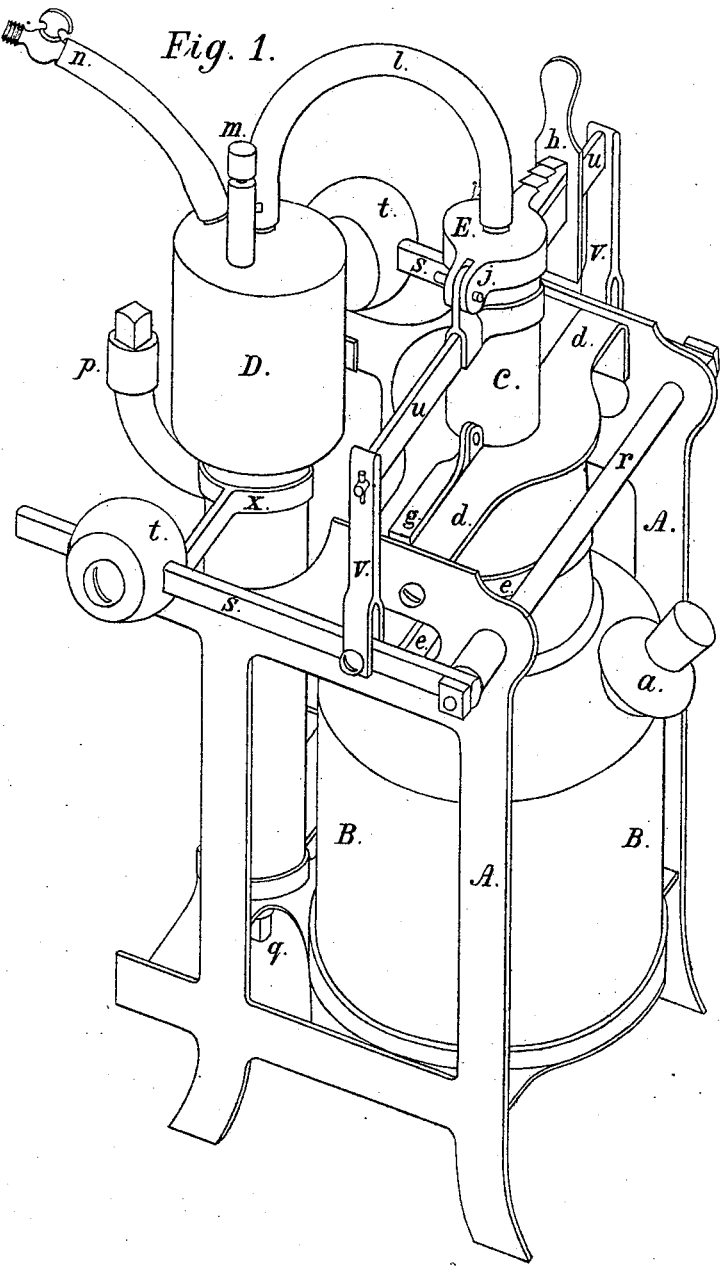
Figure 2:
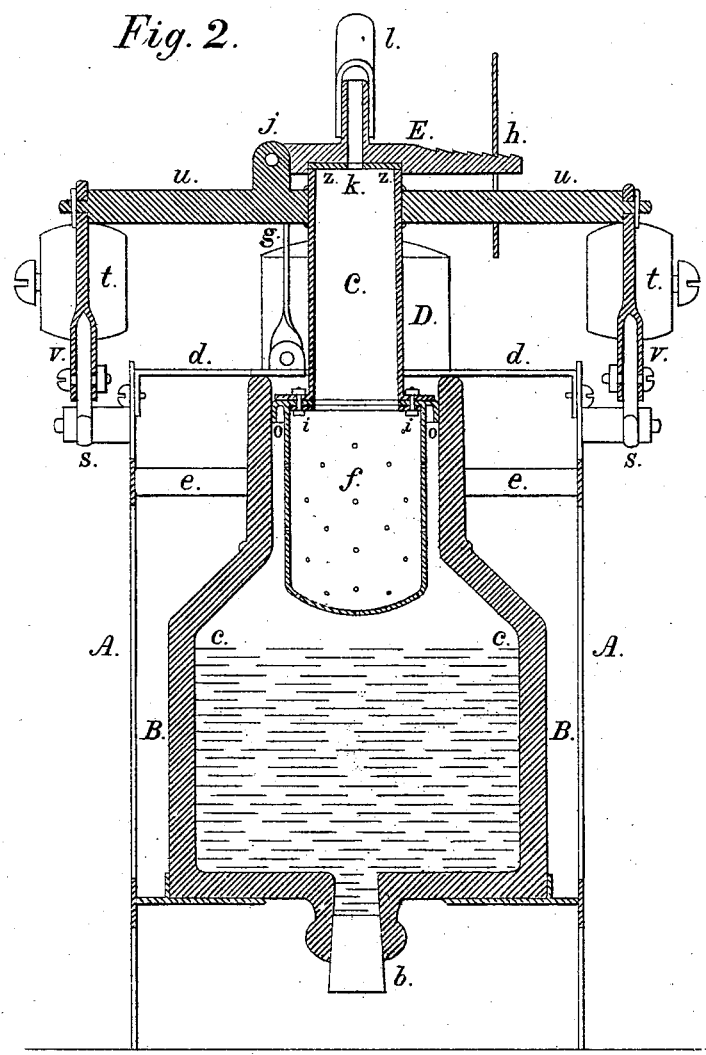

Figure 1, Sheet 1, is a perspective view of my invention, and Fig. 2, Sheet 2, a vertical sectional view.

A is the frame of the machine; B, a jar, made of suitable material, in which the carbonic-acid gas is manufactured; C, piston or piston-pipe, made hollow, (the lower part of the pipe is made a little the largest,) through which marble is conveyed to the basket or holder, which is attached to its bottom; D, a washer, in which the gas is washed; E, cover for the piston-pipe opening; $a$, inlet to the jar, through which the acid is introduced; $b$, outlet, by which the jar is emptied; $c\ c$, space in the jar for the gas when generated above the acid; $d\ d$, cover of jar B; $e\ e$, brace across the frame A, inclosing the top of jar B; $f$, basket or holder for marble, hung to the bottom of piston C; $g$, a stop or latch to hold the piston up, and keep the marble out of the acid; $h$, clamp to the cover E on the top of the piston; $i\ i$, bolts, which fasten the basket $f$ and packing to the piston; $j$, hinge to cover E; $k$, opening in the cover E, to let the gas pass from the hollow piston C to the washer D through pipe $l$; $m$, safety-valve on the top of washer D; $n$, outlet-pipe to convey the gas to the vessel when wanted; $o\ o$, piston-packing, made of one or more pieces fastened to the piston C at the inner edge, and the outer edge turned down into the jar, so that, as the gas presses upward, it forces the packing against the neck of the jar and makes a self-acting packing, a tight joint; $p$, inlet into washer D, to fill in water; $q$, outlet to washer through which to draw off the water; $r$, cross-bar forming a fulcrum for levers $s\ s$; $t\ t$, weights on the ends of levers $s\ s$, with which to regulate the pressure of the gas; $u\ u$, cross-bar attached to the head of piston C; $v\ v$, forked connections, which connect levers $s\ s$ to cross-bar $u\ u$; $z\ z$, packing.

The operation of this machine is as follows: Raise the piston C and stand up the stop $g$ under the bar $u\ u$; fill in the acid into jar B through inlet $a$ up to the letters $e\ e$. Then open cover E by sliding clamp $h$ off the bar connected with the cover, and fill up the basket and piston with pieces of marble, and then close the cover again. Then fill the washer D with water or any suitable chemical solution, and close all the cocks; remove the stop $g$ from its upright position, and the basket which holds the marble will settle down into the acid, and the action of the acid on the marble will generate gas, which will pass through piston C and through the small opening $k$ into the washer D, where it will be purified and escape through outlet $n$ to wherever it is wanted. The pressure is regulated by the weights $t\ t$ on the levers $s\ s$, which press the piston and basket down so that the basket enters the acid, and as the gas is generated it accumulates force, and, pressing against the packing $o\ o$, raises the basket out of the acid, and as the gas is used out the pressure becomes less, and the basket is pressed down by the weights, and thus it works without interruption as long as there is any strength in marble and acid, self-acting.

I claim as my invention—

1. Generator B, in combination with basket $f$, piston $c$, packing $o\ o$, packing $z\ z$, cover E, clevis $h$, cross-bar $u$ and levers $s\ s$, weights $t\ t$, and connections $v\ v$, substantially as described.

2. Cross-bar $e$, cover $d$, and generator B, all in combination with latch $g$, substantially as described.

3. The combination of safety-valve $m$, washer D, and generator B, substantially as set forth.

OTTO ZWIETUSCH.

Witnesses:
JOHN G. HIRSCH,
J. B. SMITH.